(12) United States Patent
Chiproot

(10) Patent No.: US 9,551,444 B2
(45) Date of Patent: Jan. 24, 2017

(54) PIPE COUPLING CAPSULATION ASSEMBLY

(71) Applicant: Avi Chiproot, Kfar-Saba (IL)

(72) Inventor: Avi Chiproot, Kfar-Saba (IL)

(73) Assignee: Eliezer Krausz Industrial Development Ltd., Tel Aviv (IL)

( * ) Notice: Subject to any disclaimer, the term of this patent is extended or adjusted under 35 U.S.C. 154(b) by 4 days.

(21) Appl. No.: 14/599,564

(22) Filed: Jan. 19, 2015

(65) Prior Publication Data

US 2016/0208964 A1    Jul. 21, 2016

(51) Int. Cl.
*F16L 21/06* (2006.01)
*F16L 21/00* (2006.01)
*F16L 21/03* (2006.01)
*F16L 55/172* (2006.01)

(52) U.S. Cl.
CPC ............ *F16L 21/065* (2013.01); *F16L 21/002* (2013.01); *F16L 21/03* (2013.01); *F16L 55/1725* (2013.01); *F16L 21/005* (2013.01)

(58) Field of Classification Search
USPC ... 52/220.8; 285/15, 367, 373, 419, 420, 42, 285/421
See application file for complete search history.

(56) References Cited

U.S. PATENT DOCUMENTS

| 3,467,141 | A | * | 9/1969 | Smith | F16L 17/10 138/97 |
| 4,111,234 | A | * | 9/1978 | Wells | F16L 55/178 138/167 |
| 5,605,357 | A | * | 2/1997 | Bird | F16L 55/172 285/15 |
| 7,216,795 | B2 | * | 5/2007 | Garrison | F16L 41/06 228/212 |
| 7,950,701 | B2 | * | 5/2011 | Dole | F16L 17/04 285/253 |
| 8,240,167 | B2 | * | 8/2012 | Ingram | F16L 55/103 62/259.4 |

* cited by examiner

*Primary Examiner* — Brian Glessner
*Assistant Examiner* — Adam Barlow
(74) *Attorney, Agent, or Firm* — Dekel Patent Ltd.; David Klein

(57) ABSTRACT

A pipe coupling capsulation assembly includes a band having an inner annular seal element wrappable around a pipe, opposing clamp members that extend from the band, and one or more tightening elements for clamping together the clamp members. Retaining elements are assembled to the annular seal element.

8 Claims, 7 Drawing Sheets

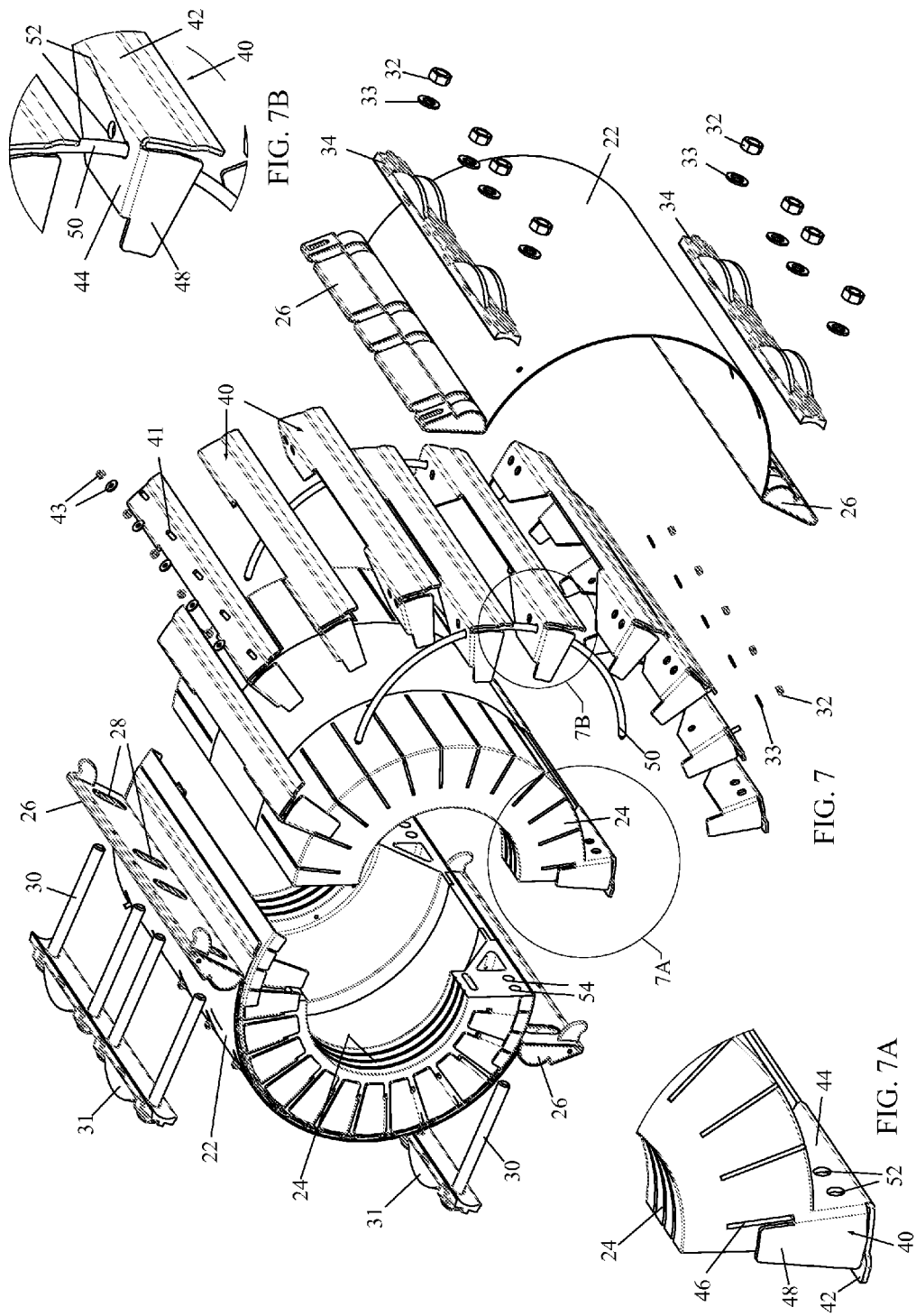

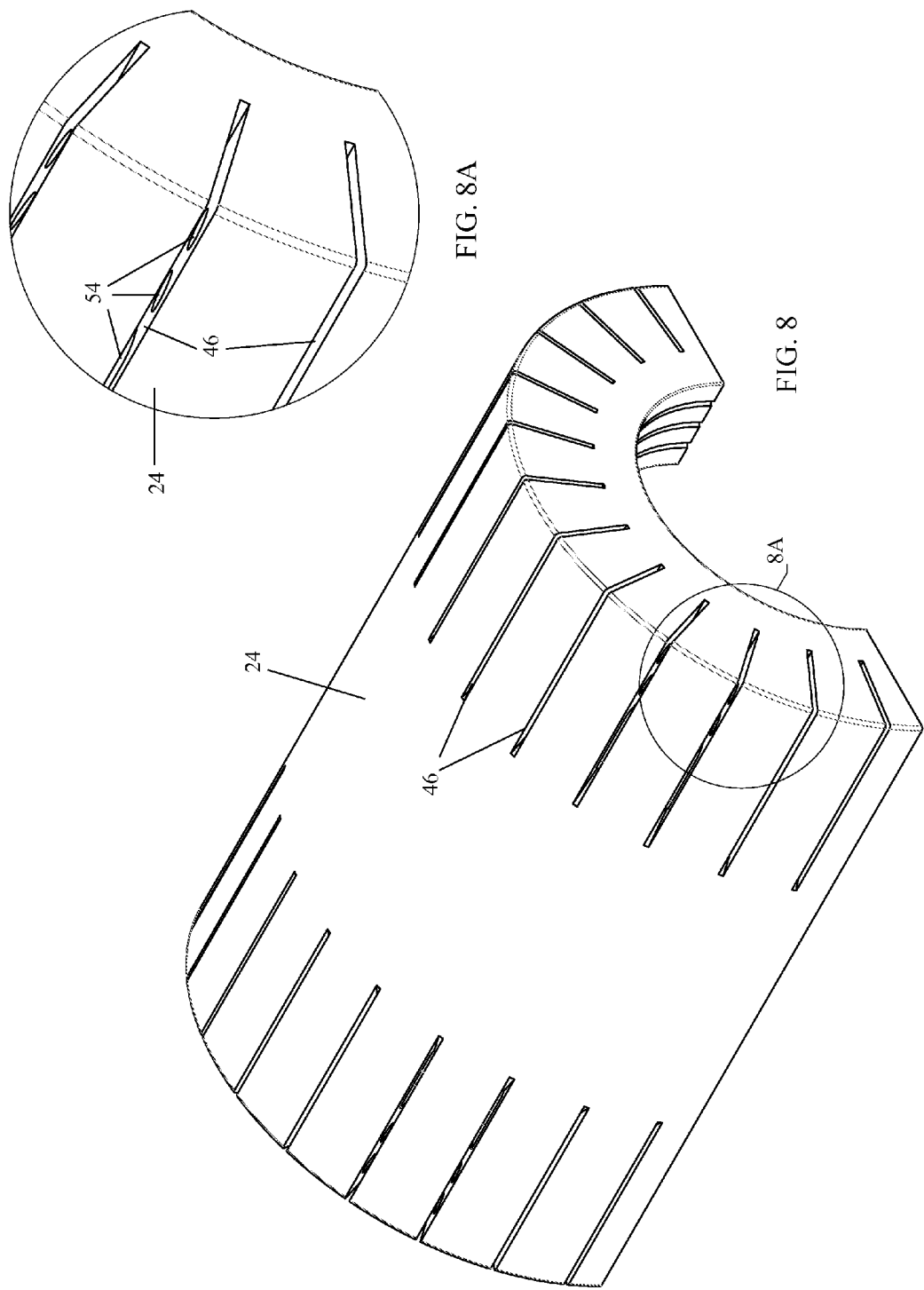

PIPE COUPLING CAPSULATION ASSEMBLY

FIELD OF THE INVENTION

The present invention relates generally to pipe coupling assemblies, such as those used to sealingly connect pipes together or to repair breaks or leaks in pipes, and particularly for pipe coupling capsulation applications in which the pipe coupling fits over existing bell-shaped joints and sleeve joints and seals the joint.

BACKGROUND OF THE INVENTION

Many kinds of removable band-type couplings for pipes exist in the art. It is noted that throughout the specification and claims, the term "pipe" encompasses any kind of generally cylindrical object, and the terms "clamp" and "coupling" are used interchangeably.

Pipeline leakage must be prevented for both economic and environmental reasons, depending on the nature of the fluid being transported. When needed repairs are inevitably carried out under field conditions, and in many situations there is a requirement that the flow of fluid in the pipeline may not be interrupted for any reason. Thus replacement of a faulty pipe joint is not an option.

Prior art seals are not capable of being used externally over an existing coupling or existing bell joint. Prior art seals lack the internal space needed if the repair seal is to be applied over and around an existing but leaking pipe joint. A further problem with many prior-art seals arises when the fluid being transported is under high pressure. This results in the seal lips being gradually pushed outwards, eventually leading to complete seal failure.

A solution to the above problems is described in Israel Patent 196511, assigned to Krausz Industries Ltd. This patent describes an external seal completely enveloping the existing leaking seal. This is referred to as a capsulation assembly. The capsulation seal assembly fits over existing bell-shaped joints, sleeve joints and the like, and seals the joint. The assembly is briefly described with reference to FIGS. 1-5.

FIG. 1 illustrates an existing bell joint coupling 1 that couples two pipes 2 and 3. A capsulation assembly 4 includes a seal 5 with an internal cavity 6 that is sized to fit over the bell joint 1, without having to disturb the bell joint 1. The seal 5 is tightened by clamp members 7 (with tightening fasteners, not shown).

FIG. 2 illustrates an existing sleeve joint coupling 8 after repair by capsulation assembly 4. As before, internal cavity 6 is sized to fit over the sleeve joint 8.

FIG. 3 illustrates the profile of seal 5, which has an outer substantially rectangular shape with surfaces 5A and internal cavity 6. Spaced-apart, circumferential passageways 9 are each formed through a portion of a seal lip 10. Axial passageways 11, transverse to circumferential passageways 9, are formed in seal lips 10 and form a hydraulic connection between circumferential passageways 9 and internal cavity 6. The hydraulic pressure within internal cavity 6 applies additional hydraulic pressure on seal lips 10 by means of fluid flowing through the passageways and pressing the lip 10 further against a pipe (not shown).

Seal lips 10 have seal surfaces 12 formed with ridges 13, which contact the pipes 2 and 3 in FIGS. 1 and 2. The ridges 13 provide clearance for surface irregularities and for small solid particles which may be entrained in the fluid flowing through the pipes.

In FIG. 4, the seal 5 is formed with surfaces 14 and 15 that slope inwards from bottom surface 16. In FIG. 5, an additional circumferential passageway 17 is formed through a portion of seal lip 10.

However, a problem of the prior art assembly can occur after tightening clamp 7. The tightening applies pressure to seal 5 and can cause portions of seal 5 to escape or migrate partly out of the clamp.

SUMMARY OF THE INVENTION

The present invention seeks to provide an improved pipe coupling capsulation assembly, as is described more in detail further below. In the present invention, the seal is provided with segmented retaining elements that prevent migration of the seal from the coupling housing.

There is provided in accordance with an embodiment of the present invention a pipe coupling capsulation assembly including a band having an inner annular seal element wrappable around a pipe, opposing clamp members that extend from the band and which are formed with mounting holes, at least one tightening element for clamping together the clamp members, the tightening element passing through the mounting holes, and a plurality of retaining elements assembled to the annular seal element.

In accordance with an embodiment of the present invention the retaining elements are received in slots formed in the annular seal element.

In accordance with an embodiment of the present invention each of the retaining elements includes a mounting portion that is received in a slot formed in the annular seal element.

In accordance with an embodiment of the present invention each of the retaining elements includes a retaining flap arranged to block outward migration of the annular seal element.

In accordance with an embodiment of the present invention each of the retaining elements includes a cap portion that extends axially across at least part of or all of a length of the annular seal element and extends a circumferential segment of a circumference of the annular seal element.

In accordance with an embodiment of the present invention a mounting portion extends from the cap portion and extends radially inwards, and is received in a radial slot formed in the annular seal element.

BRIEF DESCRIPTION OF THE DRAWINGS

The present invention will be understood and appreciated more fully from the following detailed description, taken in conjunction with the drawings in which:

FIG. 7 is an exploded illustration of the pipe coupling capsulation assembly;

FIG. 7A is detailed illustration of a retaining element inserted in a slot formed in the seal of the assembly, in accordance with a non-limiting embodiment of the present invention;

FIG. 7B is detailed illustration of a retaining wire inserted in a hole of the retaining element of the assembly, in accordance with a non-limiting embodiment of the present invention;

FIG. 8 is a perspective illustration of the seal of the assembly, in accordance with a non-limiting embodiment of the present invention; and FIG. 8A is an enlarged illustration of the seal, showing holes formed to receive the retaining wire.

DETAILED DESCRIPTION OF EXEMPLARY EMBODIMENTS

Figure 1:
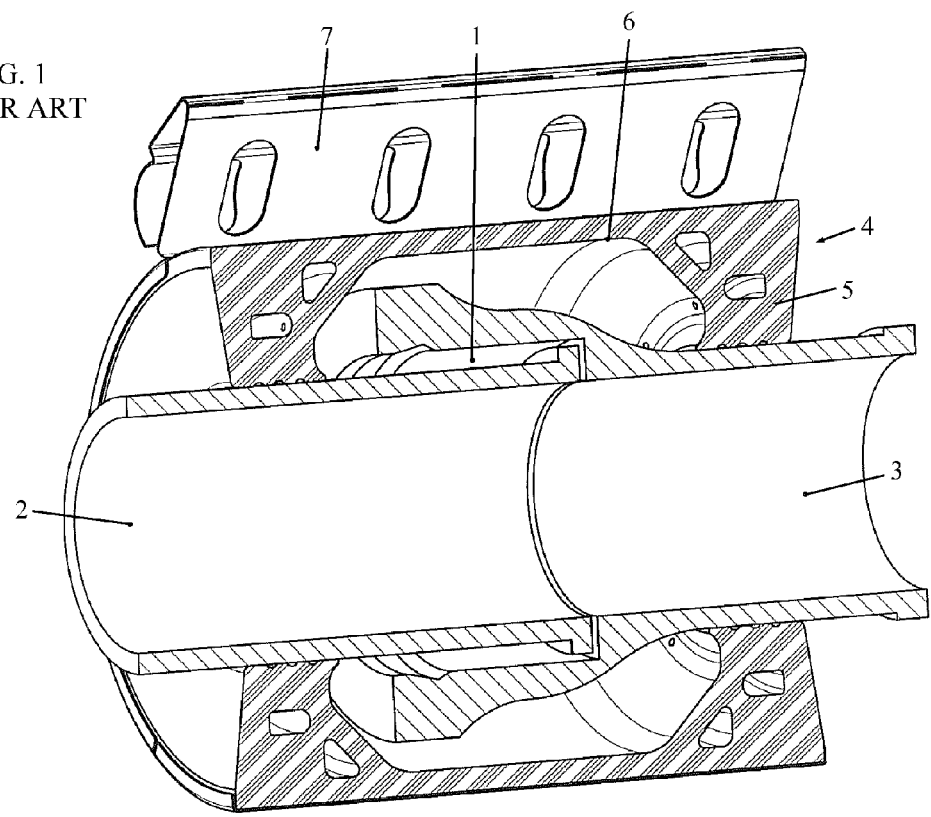
FIG. 1 is a perspective sectional illustration of a bell joint coupling after repair by an elastomer seal of the prior art, the figure also showing the external band clamp.
Figure 2:
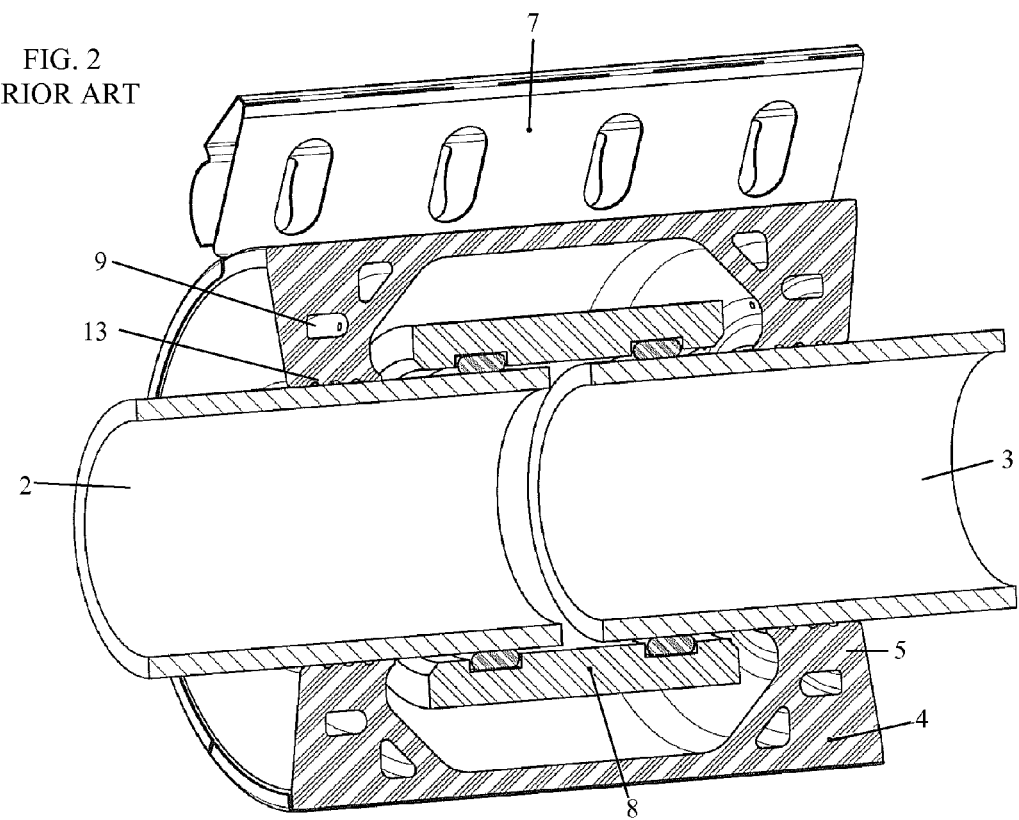
FIG. 2 is a perspective sectional illustration of a sleeve joint coupling after repair by an elastomer seal of the prior art.
Figure 3:
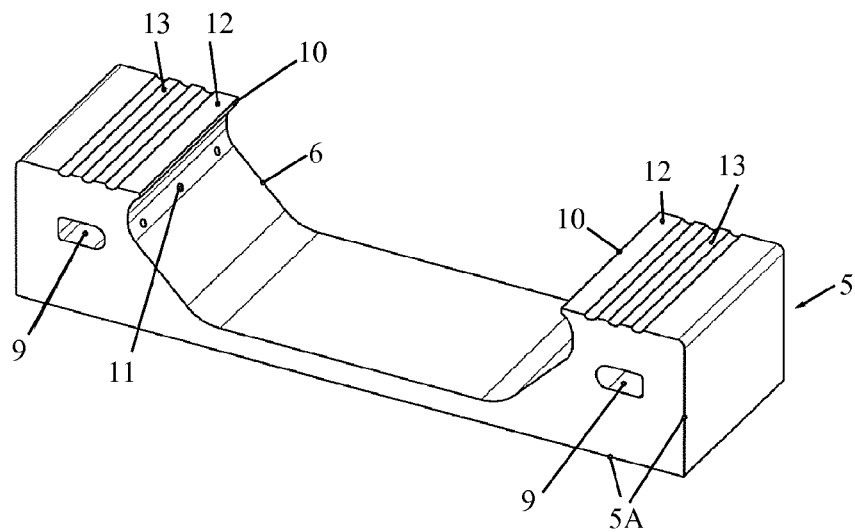
FIG. 3 is a perspective view of a short piece of the seal of the prior art.
Figure 4:
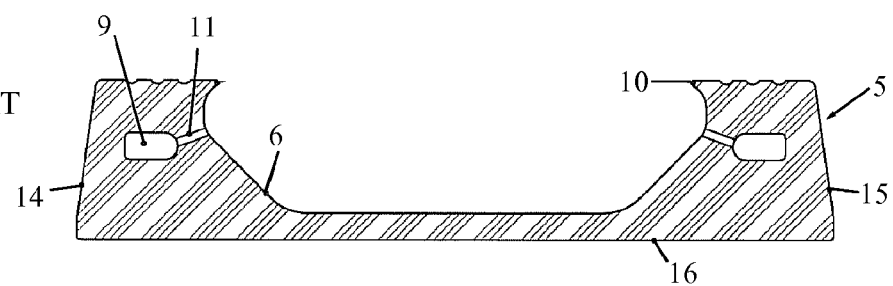
FIG. 4 is a cross sectional view of a seal of the prior art provided with sloping end faces.
Figure 5:
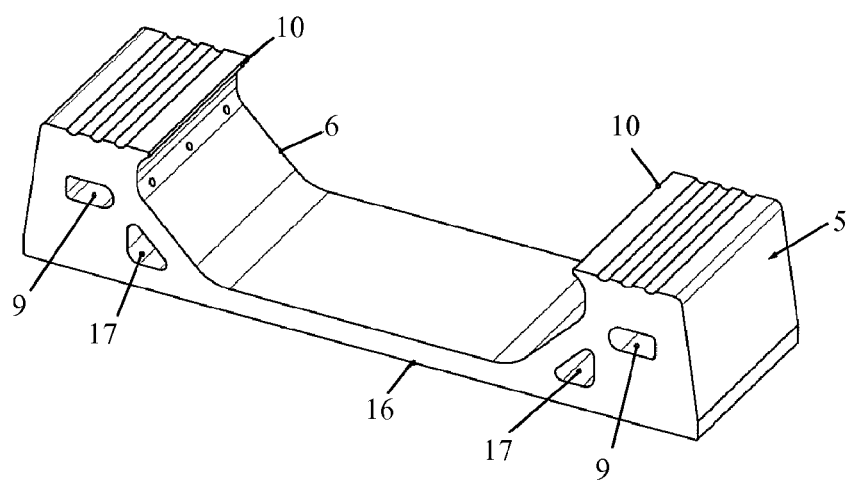
FIG. 5 is a perspective view of a short piece of a seal of the prior art provided with an additional pair of fluid passageways.
Figure 6:
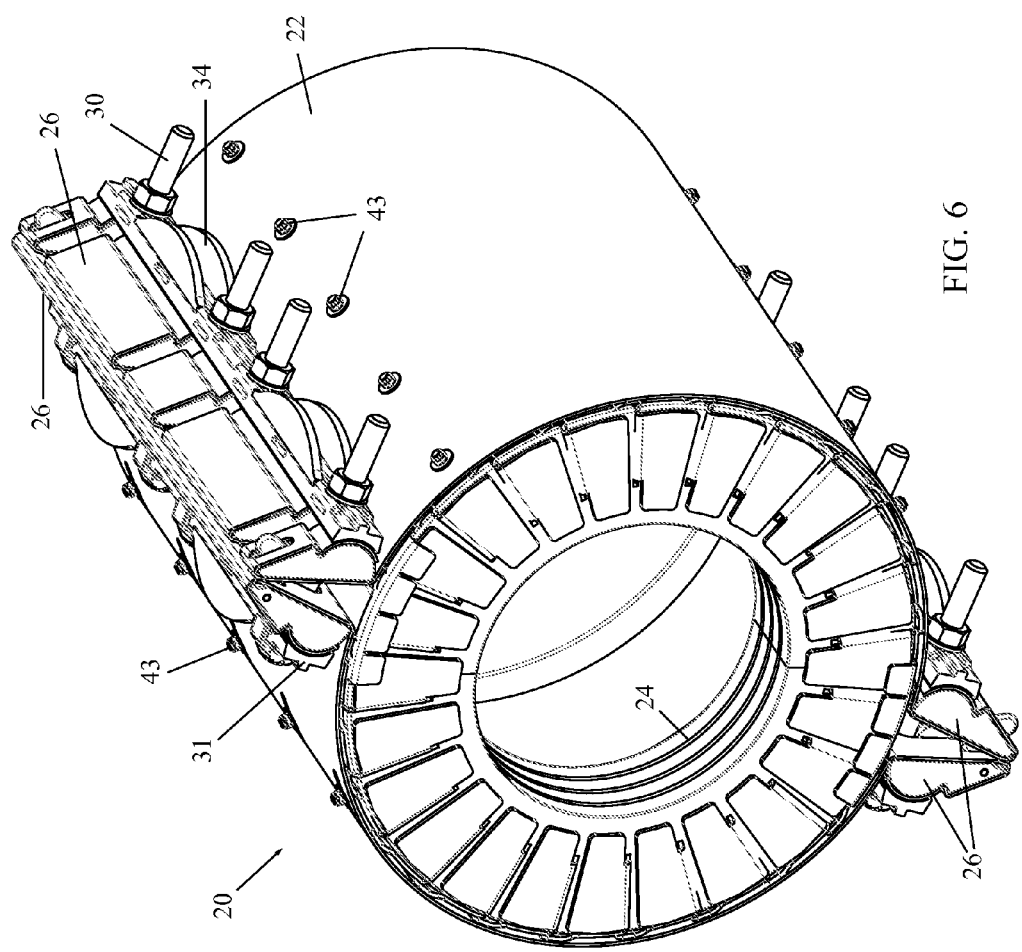
FIG. 6 is a perspective illustration of a pipe coupling capsulation assembly, constructed and operative in accordance with a non-limiting embodiment of the present invention.

Reference is now made to FIGS. 6 and 7, which illustrate a pipe coupling capsulation assembly 20, constructed and operative in accordance with a non-limiting embodiment of the present invention.

Assembly 20 includes a band 22 having an inner annular seal element 24 wrappable around a pipe (not shown). Band 22 is typically, but not necessarily, made of metal and annular seal element 24 is typically, but not necessarily, made of an elastomer, such as natural or synthetic rubber. Annular seal element 24 is similar to the abovementioned prior art seal 5 but with important structural differences as will be explained below.

Opposing clamp members 26 extend radially outwards from ends of band 22 and are formed with mounting apertures 28. Clamp member 26 are clamped and tightened together with one or more tightening elements 30, such as but not limited to, bolts that pass through a bolt plate 31, and which are tightened by nuts 32 (with optional washers 33) at a nut plate 34.

In the illustrated embodiment, band 22 and annular seal element 24 are constructed of two opposing halves and thus there are two pairs of clamp members 26 (top and bottom in the illustration). However, the invention can be carried out with one pair of clamp members 26, wherein band 22 and annular seal element 24 are split only once and are not two halves.

In accordance with a non-limiting embodiment of the present invention, a plurality of retaining elements 40 are assembled to annular seal element 24. The retaining elements 40 may be made of stainless steel or other suitably strong material. In the illustrated embodiment, each retaining element 40 includes a cap portion 42 that extends axially across at least part of or all of the length of seal element 24 and which subtends a circumferential segment of the circumference of seal element 24. A mounting portion 44 extends from cap portion 42 and extends radially inwards. Mounting portion 44 is received in radial slots 46 formed in annular seal element 24. A retaining flap 48 extends from mounting portion 44 (or from cap portion 42) and extends radially inwards. Retaining flap 48 blocks any outward migration of annular seal element 24. If desired, one or more of the retaining elements 40 may be fastened to band 22 by fasteners 43 through apertures 41 formed in retaining elements 40. Retaining elements 40 may be made by bending or other suitable method.

Radial slots 46 have the additional function of making the seal more flexible so it is much easier to give the seal its annular shape for assembly.

For additional resistance against outward migration of annular seal element 24, a retaining wire 50 may be mounted through apertures 52 and 54 formed in retaining elements 40 and annular seal element 24, respectively. The ends of the wires 50 may be joined to each other or to some other structure in the assembly, if need be, such as by fastening, twisting, soldering, bonding, etc.

What is claimed is:

1. A pipe coupling capsulation assembly comprising:
a band having an inner annular seal element wrappable around a pipe;
opposing clamp members that extend from said band;
at least one tightening element for clamping together said clamp members; and
a plurality of retaining elements assembled to said annular seal element, each of said retaining elements comprising a retaining flap arranged to block outward migration of said annular seal element, and wherein said retaining elements are received in radial slots formed in said annular seal element, and said radial slots are circumferentially spaced from each other to extend over more than half a periphery of said annular seal element.

2. The assembly according to claim 1, wherein each of said retaining elements comprises a mounting portion that is received in a slot formed in said annular seal element.

3. The assembly according to claim 1, wherein each of said retaining elements comprises a cap portion that extends axially across at least part of or all of a length of said annular seal element and subtends a circumferential segment of a circumference of said annular seal element.

4. The assembly according to claim 3, wherein a mounting portion extends from said cap portion and extends radially inwards, and is received in a radial slot formed in said annular seal element.

5. The assembly according to claim 4, wherein said retaining flap extends from said mounting portion or from said cap portion and extends radially inwards.

6. The assembly according to claim 1, wherein at least one of said retaining elements is fastened to said band.

7. A pipe coupling capsulation assembly comprising:
a band having an inner annular seal element wrappable around a pipe;
opposing clamp members that extend from said band;
at least one tightening element for clamping together said clamp members; and
a plurality of retaining elements assembled to said annular seal element, each of said retaining elements comprising a retaining flap arranged to block outward migration of said annular seal element, and further comprising a retaining wire mounted through apertures formed in said retaining elements and said annular seal element.

8. The assembly according to claim 1, wherein said band and said annular seal element are constructed of two opposing halves clamped by two pairs of said clamp members.

* * * * *